(12) United States Patent
Itoh et al.

(10) Patent No.: US 6,349,995 B1
(45) Date of Patent: Feb. 26, 2002

(54) BRAKE CONTROL SYSTEM FOR A VEHICLE

(75) Inventors: Takayuki Itoh, Ichinomiya; Satoshi Yokoyama, Nishio; Masanobu Fukami, Aichi pref.; Toshihisa Kato, Anjo; Kenji Tanaka, Kariya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/469,296

(22) Filed: Dec. 22, 1999

(30) Foreign Application Priority Data

Dec. 24, 1998 (JP) .............................. 10-376539

(51) Int. Cl.⁷ ................................................. B60T 8/40
(52) U.S. Cl. ................................ 303/116.1; 303/113.3; 303/115.4; 188/356
(58) Field of Search ......................... 303/113.1, 113.2, 303/113.3, 114.3, 115.3, 115.4, 116.1, 116.2, 139, 146, 189, 900, 901, 114.1; 188/326, 357, 358, 359

(56) References Cited

U.S. PATENT DOCUMENTS

| 5,540,488 | A | * | 7/1996 | Terazawa et al. | ......... | 303/116.1 |
| 5,676,434 | A | * | 10/1997 | Ichikawa et al. | ............ | 303/150 |
| 5,711,585 | A | * | 1/1998 | Tozu et al. | .................. | 303/146 |
| 6,039,411 | A | * | 3/2000 | Tozu et al. | ............... | 303/116.1 |
| 6,106,080 | A | * | 8/2000 | Tozu et al. | ............... | 303/116.1 |
| 6,120,113 | A | * | 9/2000 | Yamazaki et al. | ........ | 303/116.2 |

FOREIGN PATENT DOCUMENTS

| JP | 8-230634 | | 9/1996 |
| JP | 9-263234 | A * | 10/1997 |

* cited by examiner

*Primary Examiner*—Pam Rodriguez
(74) *Attorney, Agent, or Firm*—Burns, Doane, Swecker & Mathis, LLP (57) ABSTRACT

The present invention is directed to a brake control system for a vehicle, which includes a cut-off valve for opening or closing a main passage, which communicates a master cylinder with a wheel brake cylinder, and a pump for discharging the pressurized brake fluid to the wheel brake cylinder, with an outlet of the pump connected to a position between the cut-off valve and the wheel brake cylinder. An inlet valve is provided for opening or closing an auxiliary passage which communicates an inlet of the pump with the master cylinder. And, a controller is adapted to place the cut-off valve in a closed position thereof, place the inlet valve in an open position thereof, and actuate the pump to supply the pressurized brake fluid discharged from the pump into the wheel brake cylinder, when a brake-assist control is to be performed. A detection device such as a pressure sensor is provided for detecting an amount of operation of a brake pedal, so that the controller controls an amount of operation of the pump in response to variation of the amount of operation of the brake pedal detected by the detection device.

4 Claims, 5 Drawing Sheets

BRAKE CONTROL SYSTEM FOR A VEHICLE

This application claims priority under 35 U.S.C. Sec. 119 to No.10-376539 filed in Japan on Dec. 24, 1998, the entire content of which is herein incorporated by reference.

BACKGROUND OF THE INVENTION

1. Field of the Invention

The present invention relates to a brake control system for a vehicle, with a brake-assist control function which assists a vehicle driver to operate a brake pedal, by increasing braking force automatically, when a brake pedal is depressed rapidly or deeply.

2. Description of the Related Arts

In the case where a brake pedal is rapidly depressed for an emergency braking purpose when driving a vehicle, for example, it will occasionally happen that sufficient braking force cannot be obtained, due to lack of depressing force, or hardly maintaining the depressing force. Even if the vehicle is provided with an ant-skid control system (ABS), the ant-skid control may not start due to lack of depressing force applied to the brake pedal, so that such a particular function may not be performed effectively. In view of those defects, it has been proposed to add a brake-assist control function, and some of them are already installed in vehicles on the market. The brake-assist control is the one for increasing the braking force automatically to assist a vehicle driver to operate a brake pedal, when the brake pedal is rapidly depressed, or the brake pedal is depressed deeply. For this purpose, a boosting function of a vacuum booster is controlled, in general. With the brake-assist control provided, therefore, the anti-skid control or the like can be performed effectively.

Also, it is known that the brake-assist control is performed by a pump for use in the anti-skid control system. In Japanese Patent Laid-open Publication No.8-230634, for example, a method and apparatus for controlling the anti-lock control system or a traction control system are proposed to save the power of the vacuum booster fully or partially. In that publication, it is assumed that the operation similar to the above brake-assist control may be performed, while the structure is not clear, due to its insufficient description. It is also assumed that when the brake-assist control is to be performed, an increasing gradient of the wheel cylinder pressure is controlled by turning on a pump motor, or controlling on/off of the motor, with an inlet valve placed in its open position, and with a changeover valve placed in its closed position. As a result, it may be possible to reduce a noise caused when driving the pump motor, comparing with that caused when driving the pump motor continuously. In that publication, however, nothing is described about the necessity for reducing the noise when the brake-assist control is being performed. Especially, when the brake pedal is deeply depressed to perform the brake-assist control, the pump is actuated frequently, so that the noise caused by actuating the pump will not be an issue to be neglected.

SUMMARY OF THE INVENTION

Accordingly, it is an object of the present invention to provide a brake control system which performs a brake-assist control by supplying the hydraulic braking pressure output from a hydraulic pressure pump, and which performs the brake-assist control quietly, by reducing a noise of a pressure pump actuated during the brake-assist control operation.

In accomplishing the above and other objects, a brake control system for a vehicle includes a wheel brake cylinder operatively mounted on each wheel of the vehicle for applying a braking force thereto, and a master cylinder for pressurizing brake fluid to supply a hydraulic pressure to the wheel brake cylinder in response to operation of a brake pedal. A cut-off valve is provided for opening or closing a main passage, which communicates the master cylinder with the wheel brake cylinder. A pump is provided for discharging the pressurized brake fluid to the wheel brake cylinder, with an outlet of the pump connected to a position between the cut-off valve and the wheel brake cylinder. An inlet valve is provided for opening or closing an auxiliary passage, which communicates an inlet of the pump with the master cylinder. And, a controller is provided for controlling the cut-off valve, inlet valve and pump. The controller is adapted to place the cut-off valve in a closed position thereof, place the inlet valve in an open position thereof, and actuate the pump to supply the pressurized brake fluid discharged therefrom into the wheel brake cylinder, so as to perform a brake-assist control. A detection device is provided for detecting an amount of operation of the brake pedal, so that the controller controls an amount of operation of the pump in response to variation of the amount of operation of the brake pedal detected by the detection device.

In the above described brake control system, preferably the detection device includes a pressure sensor for detecting a hydraulic pressure output from the master cylinder, and the controller is adapted to control the amount of operation of the pump, which is provided when it is determined on the basis of the output of the detection device that the master cylinder pressure is being decreased or held, to be smaller than the amount of operation of the pump, which is provided when it is determined on the basis of the output of the pressure sensor that the master cylinder pressure is being increased.

Preferably, the brake control system further includes an electric motor for actuating the pump, and the controller may be adapted to control a duty of a signal for driving the motor, which is provided when it is determined on the basis of the output of the pressure sensor that the master cylinder pressure is being decreased or held, to be smaller than the duty of the signal for driving the motor, which is provided when it is determined on the basis of the output of the pressure sensor that the master cylinder pressure is being increased.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENT

Figure 1:
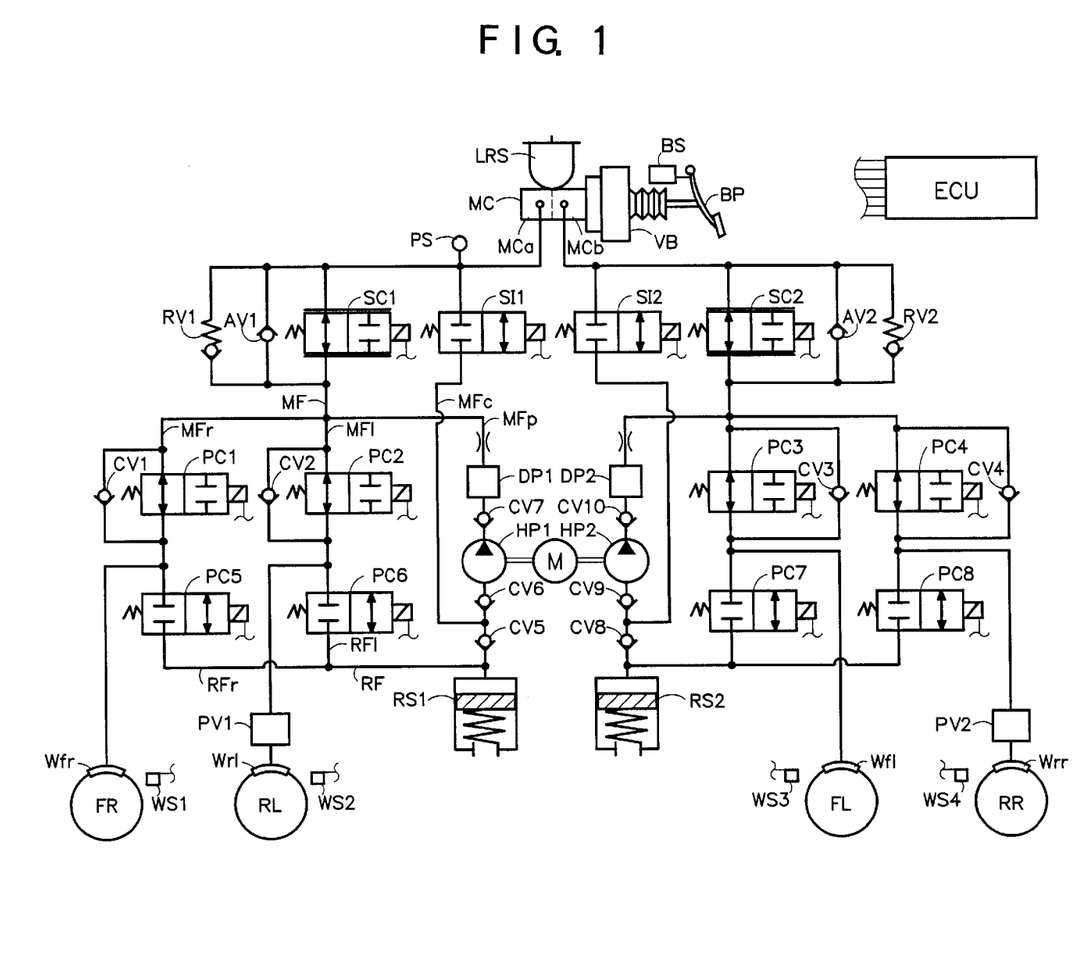
FIG.1 is a block diagram illustrating a brake control system according to an embodiment of the present invention.

Referring to FIG.1, there is schematically illustrated a brake control system according to the present invention, wherein wheel brake cylinders Wfl, Wfr, Wrl, Wrr are operatively mounted on the front wheels FL, FR and rear wheels RL, RR of the vehicle, respectively. The wheel FL designates the wheel at the front left side as viewed from the position of a driver's seat, the wheel FR designates the wheel at the front right side, the wheel RL designates the wheel at the rear left side, and the wheel RR designates the wheel at the rear right side.

According to the present embodiment, a master cylinder MC is activated though a vacuum booster VB in response to depression of a brake pedal BP to pressurize the brake fluid in a low-pressure reservoir LRS and discharge the master cylinder pressure to the hydraulic pressure circuits for the wheels FR, RL and the wheels FL, RR, respectively. The master cylinder is of a tandem type having two pressure chambers communicated with two hydraulic pressure circuits, respectively. That is, a first pressure chamber MCa is communicated with the hydraulic pressure circuit for the wheels FR, RL, and a second pressure chamber MCb is communicated with the hydraulic pressure circuit for the wheels FL, RR. Thus, according to the present embodiment, the hydraulic pressure circuit system is divided into two circuits to form a diagonal circuit (X-circuit) system, while a front-rear dual circuit system may be formed.

In the hydraulic pressure circuit for the wheels FR, RL, the first pressure chamber MCa is communicated with wheel brake cylinders Wfr, Wrl respectively, through a main passage MF and its branch passages MFr, MFl. A normally open solenoid operated cut-off valve SC1 (hereinafter, simply referred to as a cut-off valve SC1, and designated by SC* for representing two circuits) is disposed in the main passage MF. According to the present embodiment, the cut-off valve SC* is of a linear solenoid type, and controlled such that the pressure difference between the inlet and outlet of the cut-off valve SC* varies in response to the current for actuating the solenoid thereof. Also, the first pressure chamber MCa is communicated through an auxiliary passage MFc with check valves CV5, CV6, which will be described later. A normally closed solenoid operated inlet valve SI1 (hereinafter, simply referred to as an inlet valve SI1, and designated by SI* for representing two circuits) is disposed in the auxiliary passage MFc. Each of the cut-off valve SC1 and inlet valve SI1 is formed by a two-port two-position solenoid operated valve.

And, normally open two-port two position solenoid operated switching valves PC1, PC2 (hereinafter, simply referred to as switching valves PC1, PC2) are disposed in the branch passages MFr, MFl, respectively, and in parallel therewith check valves CV1, CV2 are disposed, respectively. The check valves CV1, CV2 are provided for allowing the flow of the brake fluid toward the master cylinder MC and preventing the flow of the brake fluid toward the wheel brake cylinders Wfr, Wrl. The brake fluid in the wheel brake cylinders Wfr, Wrl is returned to the master cylinder MC, and then to the low-pressure reservoir LRS through the check valves CV1, CV2 and the cut-off valve SC1 placed in its open position as shown in FIG.1. Accordingly, if the brake pedal BP is released, the hydraulic braking pressure in the wheel brake cylinders Wfr, Wrl is rapidly reduced to the pressure lower than the pressure at the master cylinder MC. And, normally closed two-port two position solenoid operated switching valves PC5, PC6 (hereinafter, simply referred to as switching valves PC5, PC6) are disposed in the branch passages RFr, RFl, respectively, which merge into the drain passage RF connected to the reservoir RS1.

In the hydraulic pressure circuit for the wheels FR, RL, the switching valves PC1, PC2 and the switching valves PC5, PC6 form the modulators of the present invention, respectively. A hydraulic pressure pump HP1 is disposed in a passage MFp connected to the branch passages MFr, MFl at the upstream of the switching valves PC1, PC2, and an outlet of the pressure pump HP1 is connected to the switching valves PC1, PC2 through a check valve CV7. The pressure pump HP1 and a pressure pump HP2 in the other hydraulic pressure circuit are driven by a single electric motor M to introduce the brake fluid from the inlets, pressurize the brake fluid to a predetermined pressure, and discharge it from the outlets. The reservoir RS1 is disposed independently from the low-pressure reservoir LRS of the master cylinder MC, and provided with a piston and a spring to function as an accumulator for storing a necessary volume of the brake fluid for various controls.

The master cylinder MC is connected to a position between the check valves CV5 and CV6 disposed at the inlet side of the pressure pump HP1 through the auxiliary passage MFc. The check valve CV5 is provided for preventing the flow of the brake fluid toward the reservoir RS1 and allowing the reverse flow. The check valves CV6, CV7 are provided for restricting the flow of the brake fluid discharged from the pressure pump HP1 in a predetermined direction, and formed in general within the pressure pump HP1 in a body. Accordingly, the inlet valve SI1 is normally placed in its closed position as shown in FIG.1, where the communication between the master cylinder MC and the inlet of the pressure pump HP1 is blocked, and switched to its open position, where the master cylinder MC is communicated with the inlet of the pressure pump HP1.

In parallel with the cut-off valve SC1, is disposed a relief valve RV1 which prevents the brake fluid in the master cylinder MC from flowing toward the switching valves PC1, PC2, and allows the brake fluid to flow toward the master cylinder MC when the braking pressure at the switching valves PC1, PC2 is more than the braking pressure at the master cylinder MC by a predetermined pressure difference, and a check valve AV1 which allows the flow of the brake fluid toward the wheel brake cylinders Wfr, Wrl, and prevents its reverse flow. The relief valve RV1 is provided for returning the brake fluid to the low-pressure reservoir LRS through the master cylinder MC when the pressurized braking pressure discharged from the pressure pump HP1 is more than the braking pressure discharged from the master cylinder MC by the predetermined pressure difference, thereby to modulate the braking pressure in the main passage MF not to exceed a predetermined pressure. Because of the check valve AV1, even if the cut-off valve SC1 is in its closed position, when the brake pedal BP is depressed, the hydraulic braking pressure in the wheel brake cylinders Wfr, Wrl is increased. A damper DP1 is disposed at the outlet side of the pressure pump HP1, and a proportioning valve PV1 is disposed in a passage connected to the rear wheel brake cylinder Wrl.

In the hydraulic pressure circuit for the wheels FL, RR, are disposed a reservoir RS2, damper DP2, proportioning valve PV2, normally open two-port two-position solenoid operated cut-off valve SC2, normally closed two-port two-position solenoid operated inlet valve SI2, normally open two-port two-position solenoid operated switching valves PC3, PC4, normally closed two-port two-position solenoid operated switching valves PC7, PC8, check valves CV3, CV4, CV8–CV10, relief valve RV2, and check valve AV2. The pressure pump HP2 is driven by the electric motor M together with the pressure pump HP1, both of the pumps HP1 and HP2 will be driven continuously after the motor M starts to operate them. The cut-off valves SC1, SC2, inlet valves SI1, SI2 and switching valves PC1–PC8 are controlled by the electronic controller ECU to perform the control modes such as the anti-skid control mode.

Wheel speed sensors WS1–WS4 are provided for the wheels FR, RL, FL and RR, respectively, and connected to the electronic controller ECU, so that a signal having pulses proportional to a rotational speed of each wheel, i.e., a wheel speed signal is fed to the electronic controller ECU. Furthermore, there are provided a brake switch BS which is turned on when the brake pedal BP is depressed, and turned off when the brake pedal BP is released. Also, a pressure sensor PS is connected to the electronic controller ECU, so that a signal indicative of the master cylinder pressure is input to the electronic controller ECU. The electronic controller ECU is provided with a microcomputer (not shown) which includes a central processing unit (CPU), memories (ROM, RAM), an input port, an output port, and etc. The signals detected by each of the wheel speed sensors WS1 to WS4, brake switch BS and the like are fed to the input port via respective amplification circuits (not shown) and then to the central processing unit. Then, control signals are fed from the output port to the valves as described later via the respective driving circuits (not shown). In the electronic controller ECU, the memory (ROM) memorizes a program for use in various vehicle controls, the central processing unit (CPU) executes the program while the ignition switch (not shown) is closed, and the memory (RAM) temporarily memorizes variable data needed to execute the program.

According to the hydraulic pressure system as described above, each of the valves is placed in its normal positions as shown in FIG. 1, and the motor M is stopped, during the normal braking operation. When the brake pedal BP is depressed in the conditions as shown in FIG. 1, the master cylinder MC is actuated to discharge the master cylinder pressure from the first and second pressure chambers MCa, MCb to the hydraulic pressure circuit for the wheels FR, RL, and the hydraulic pressure circuit for the wheels FL, RR, respectively, and supply the pressure into the wheel brake cylinders Wfr, Wrl, Wfl, Wrr, through the cut-off valves SC1, SC2 and the switching valves PC1–PC8 placed in their open positions. Furthermore, when the brake-assist control is performed, the cut-off valve SC* is placed in its closed position and the inlet valve SI* is placed in its open position, and the motor M are driven, as will be described later with reference to FIG.3. During the braking operation, when the wheel FR tends to be locked for example, and the anti-skid control is initiated, the switching valve PC1 is changed to its closed position, and the switching valve PC5 is placed in its open position, while the cut-off valve SC1 is placed in its open position. As a result, the brake fluid in the wheel brake cylinder Wfr is drained into the reservoir RS1 through the switching valve PC5 to reduce the pressure in the wheel brake cylinder Wfr. Since the hydraulic pressure circuits for the wheels FR, RL and wheels FL, RR are substantially the same, only the hydraulic pressure circuit for the wheels FR, RL will be explained hereinafter.

When a pulse pressure increase mode is selected for the wheel brake cylinder Wfr, the switching valve PC5 is placed in its closed position and the switching valve PC1 is placed in its open position, so that the master cylinder pressure is supplied from the master cylinder MC to the wheel brake cylinder Wfr through the switching valve PC1 in its open position. Then, the switching valve PC1 is opened and closed alternately, so that the pressure in the wheel brake cylinder Wfr is increased and held repeatedly like pulses thereby to be increased gradually. When a rapid pressure increase mode is selected for the wheel brake cylinder Wfr, the switching valve PC5 is placed in its closed position, and then the switching valve PC1 is placed in its open position, so that the master cylinder pressure is supplied from the master cylinder MC to the wheel brake cylinder Wfr. When the brake pedal BP is released and the master cylinder pressure comes to be lower than the pressure in the wheel brake cylinder Wfr, the brake fluid in the wheel brake cylinder Wfr is returned to the master cylinder MC through the check valve CV1 and the cut-off valve SC1 placed in its open position, and consequently to the low pressure reservoir LRS. Thus, an independent braking force control is performed with respect to each wheel.

According to the present embodiment as constituted above, a program routine for the vehicle motion control including the brake-assist control, anti-skid control or the like is executed by the electronic controller ECU, as will be described hereinafter with reference to FIGS.2–4. The program routine starts when an ignition switch (not shown) is turned on. At the outset, the program provides for initialization of the system at Step 101 to clear various data. At Step 102, read by the electronic controller ECU are the signals detected by the wheel speed sensors WS1 to WS4 and the signal (master cylinder pressure Pmc) detected by the pressure sensor PS. Thus, the master cylinder pressure Pmc is employed to indicate the amount of braking operation in the present embodiment, while a stroke of the brake pedal may be used. Then, the program proceeds to Step 103 where the master cylinder pressure Pmc is differentiated to provide a varying rate of the master cylinder pressure (DPmc). And, at Step 104, a wheel speed Vw of each wheel ( designates one of the wheels FL, FR, RL, RR) is calculated, and differentiated to provide a wheel acceleration DVw of each wheel. Then, at Step 105, the maximum of the wheel speeds Vw for four wheels is calculated to provide an estimated vehicle speed Vso on a gravity center of the vehicle (Vso=MAX[Vw]), and an estimated vehicle speed Vso is calculated for each wheel, respectively, on the basis of the wheel speed Vw. The estimated vehicle speed Vso may be normalized to reduce the error caused by a difference between the wheels located on the inside and outside of the curve while cornering. Furthermore, the estimated vehicle speed Vso is differentiated to provide an estimated vehicle acceleration (including deceleration) DVso on the gravity center of the vehicle. At Step 106, also calculated is an actual slip rate Sa on the basis of the wheel speed Vw for each wheel and the estimated vehicle speed Vso** (or, the estimated and normalized vehicle speed) which are calculated at Steps 104 and 105, respectively, in accordance with the following equation:

$$Sa^{}=(Vso^{}-Vw^{})/Vso^{}$$

Next, at Step 107, on the basis of the estimated vehicle acceleration DVso on the gravity center of the vehicle and the actual lateral acceleration Gya detected by the lateral acceleration sensor YG, the coefficient of friction $\mu$ against a road surface can be calculated in accordance with the following equation:

$$\mu \approx (DVso^2+Gya^2)^{1/2}$$

In order to detect the coefficient of friction against the road surface, various methods may be employed other than the above method, such as a sensor for directly detecting the coefficient of friction against the road surface, for example. Then, at Step 108, is executed the brake-assist control as will be described later.

And, the program proceeds to Step 109 where various control modes such as the steering control by braking mode are set, and the desired slip rates therefor are provided. Then, the hydraulic pressure servo control is executed at Step 110, whereby the motor M and the solenoid valves are actuated to control the braking force to each wheel. The steering control by braking mode is the one in which the brake fluid is pressurized automatically irrespective of depression of the brake pedal BP to provide the oversteer restraining control and/or the understeer restraining control. The steering control by braking mode is added to each of other control modes such as the above-described anti-skid control mode, wherein the braking force applied to each wheel is controlled so as to prevent the wheel from being locked during the vehicle braking operation. In the front-rear braking force distribution control mode, a distribution between the braking force applied to rear wheels and the braking force applied to front wheels is controlled so as to maintain the vehicle stability during the vehicle braking operation. Further, in the traction control mode, the braking force is applied to the driven wheel, and the throttle control is performed, so as to control a driving force to the driven wheel. After the hydraulic pressure servo control is executed on the basis of those control modes at Step 110, the program returns to Step 102. If it is determined at Step 109 that the condition for initiating the steering control by braking has not been fulfilled, and no control modes have been set, the program returns to Step 102, after the solenoids for all of the valves were turned off.

Figure 2:
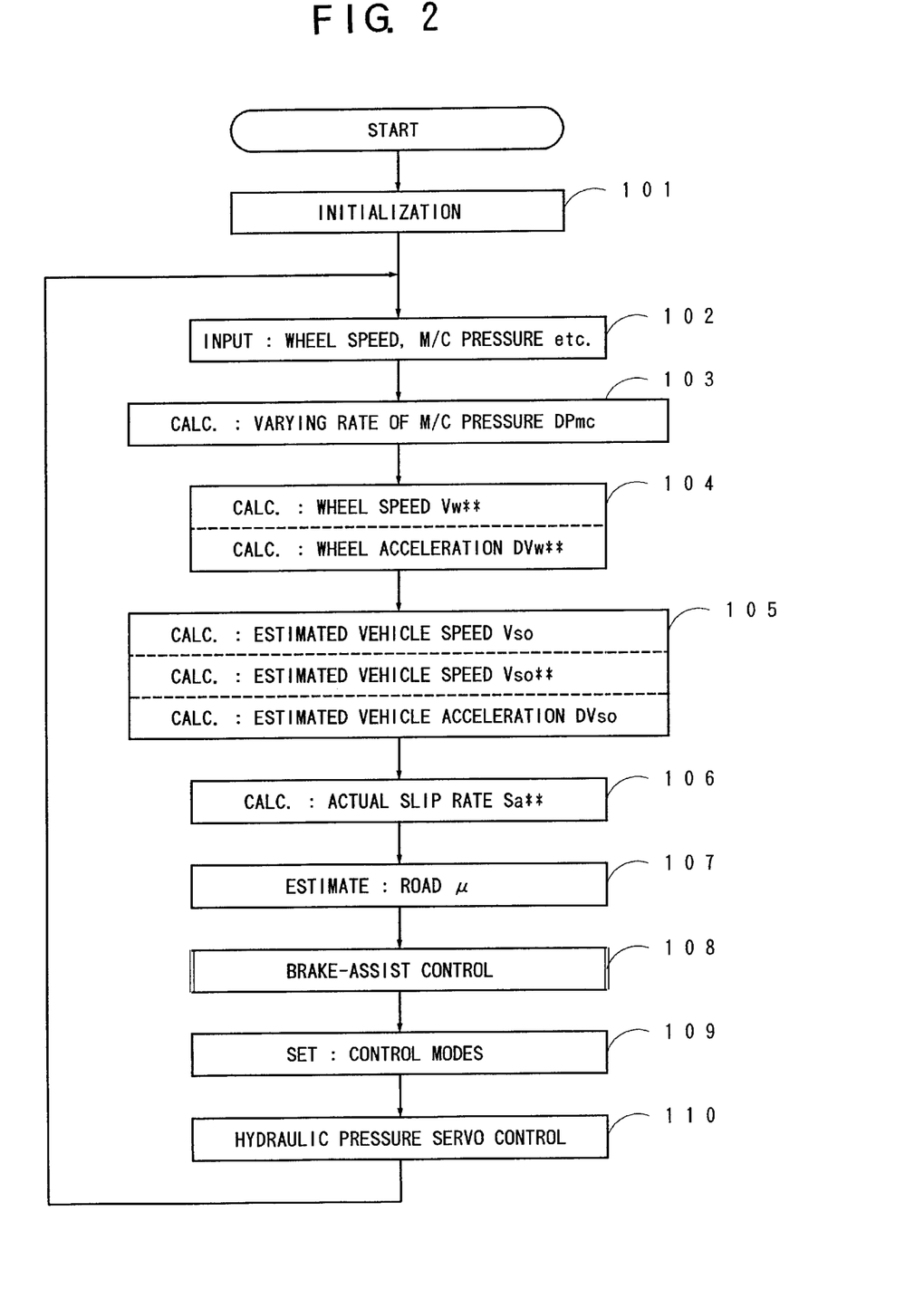
FIG.2 is a flowchart showing a main routine of the brake control according to an embodiment of the present invention.
Figure 3:
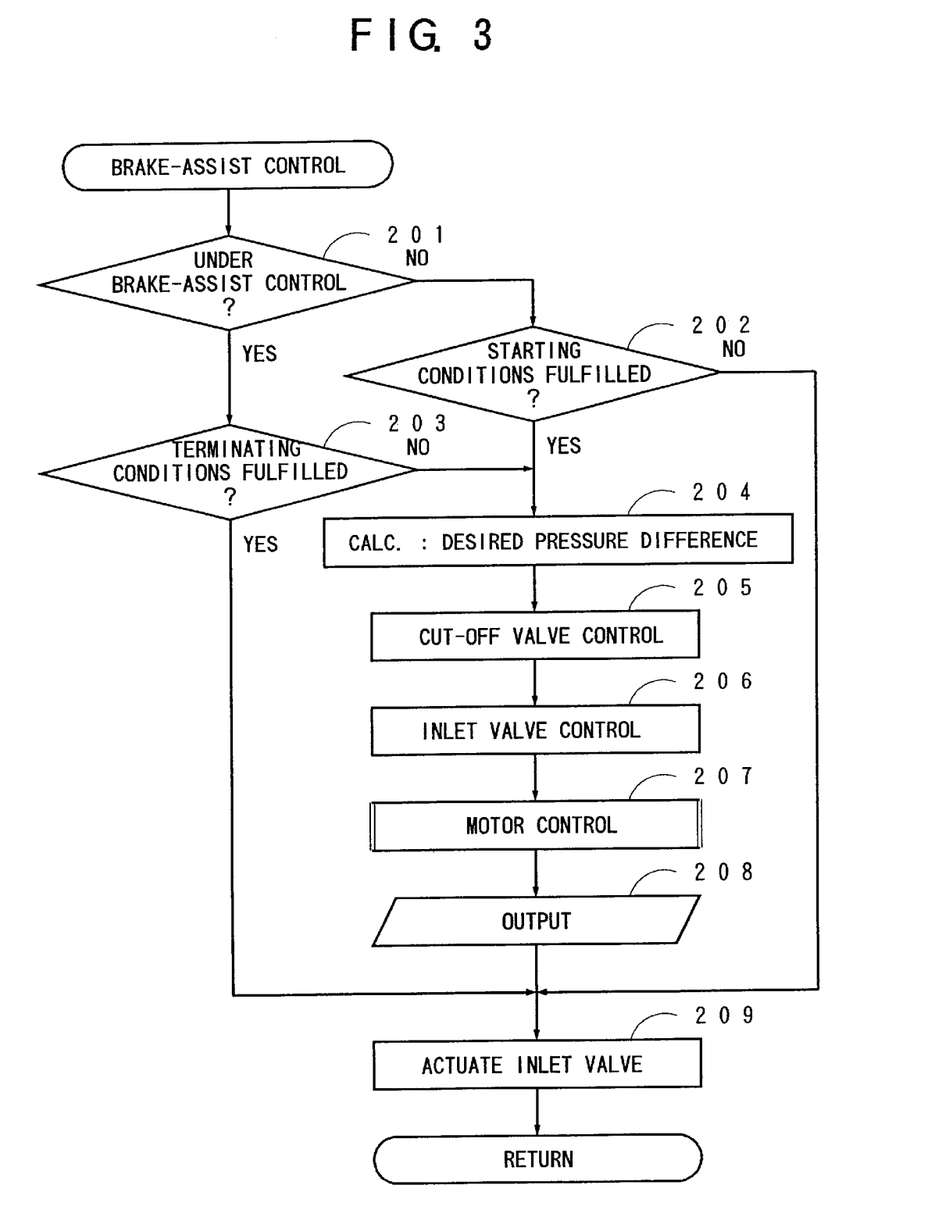
FIG.3 is a flowchart showing a sub-routine of a brake-assist control according to an embodiment of the present invention.

FIG.3 shows the operation of the brake-assist control executed at Step 108 as shown in FIG.2. At the outset, it is determined at Step 201 whether the brake-assist control is being performed (i.e., under control), or not. If the brake-assist control is not being performed, the program proceeds to Step 202, where it is determined whether the condition for initiating the brake-assist control has been fulfilled, or not. If it is determined that the condition for initiating the brake-assist control has been fulfilled, the program proceeds further to Step 204 and Steps following it, otherwise the program proceeds to Step 209. The condition for initiating the brake-assist control is fulfilled, provided that the master cylinder pressure Pmc detected by the pressure sensor PS is greater than a predetermined value, and that the varying rate DPmc of the master cylinder pressure is greater than a predetermined rate.

When it is determined at Step 201 that the brake-assist control is being performed, the program proceeds to Step 203, where it is determined whether the condition for terminating the brake-assist control has been fulfilled, or not. The condition for terminating the brake-assist control is fulfilled, provided that the master cylinder pressure Pmc detected by the pressure sensor PS is smaller than the predetermined value. If it is determined that the condition for terminating the brake-assist control has not been fulfilled, the program further proceeds to Step 204 and Steps following it, otherwise the program proceeds to Step 209.

Figure 5:
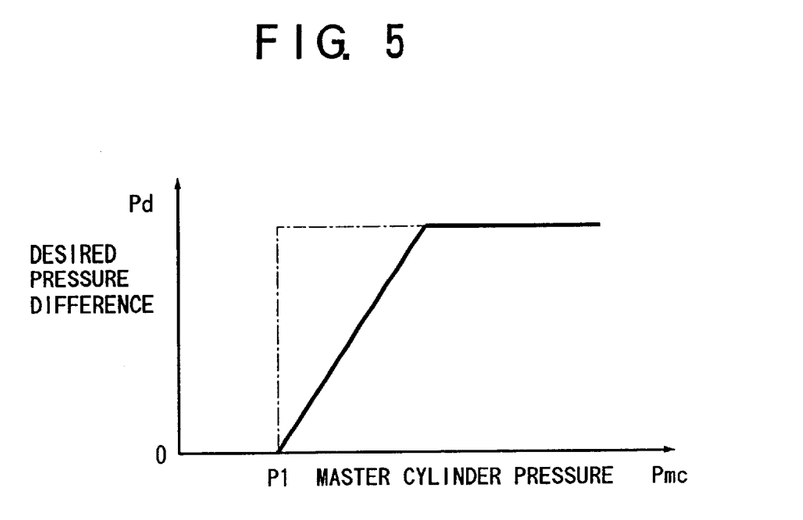
FIG.5 is a diagram showing a map for setting a desired pressure difference according to an embodiment of the present invention.

At Step 204, a desired value of the pressure difference between the upstream and downstream of the cut-off valve SC* (i.e., a desired pressure difference Pd) is set in accordance with a map as shown in FIG.5, for example. In FIG.5, the desired pressure difference Pd is set to be gradually increased after the master cylinder pressure Pmc has reached to a predetermined pressure P1, and maintained to be a constant value after the desired pressure difference Pd has reached to a predetermined value. Thus, the desired pressure difference Pd is set to be gradually increased, so that the brake-assist control can be performed smoothly. However, the cut-off valve SC* may be constituted by a conventional solenoid operated switching valve having such a characteristic as indicated by a broken line in FIG.5.

Figure 6:
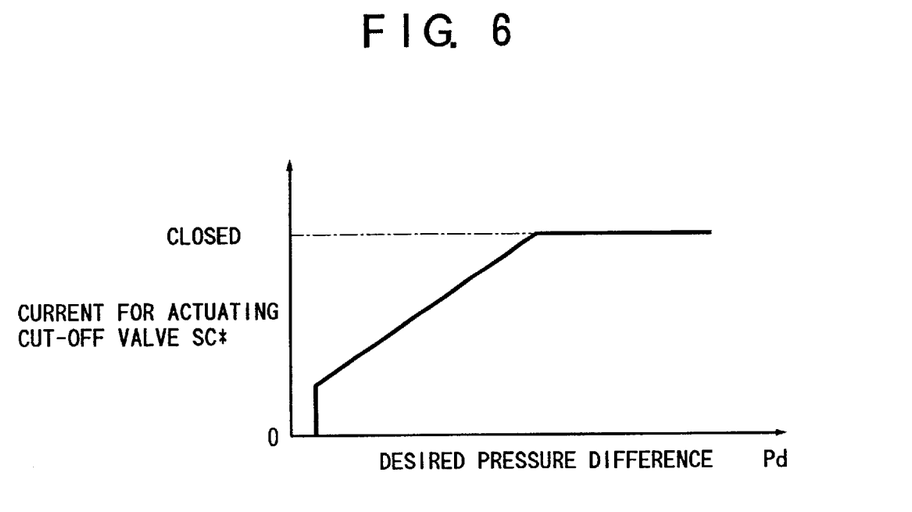
FIG.6 is a diagram showing a map for controlling a cut-off valve according to an embodiment of the present invention.

Then, at Step 205, a process for controlling the cut-off valve SC* is made to set a current for actuating it in accordance with a map as shown in FIG.6. That is, the electric current for actuating the cut-off valve SC* is set in response to the desired pressure difference Pd set at Step 204, as shown in FIG.6. Then, a process for controlling the inlet valve SI* is made at Step 206, where a duty (ratio of the current fed to it) is set in response to the difference between a desired deceleration and an actual deceleration, the explanation of which will be omitted, because it does not directly relate to the present invention. Then, the program further proceeds to Step 207, where a process for controlling the motor M is made, as will be described later. Accordingly, the signal obtained in each process is output at Step 208, and the program proceeds to Step 209 where the inlet valve SI* is actuated to be placed in its open position prior to the automatic pressurization for the brake-assist control or the like, thereby to fulfill the pressurize brake fluid into the auxiliary passage MFc or the like in advance. The controlled amount of the brake-assist control can be adjusted by controlling the switching valves PC1–PC8 of the modulator to be opened or closed appropriately.

Figure 4:
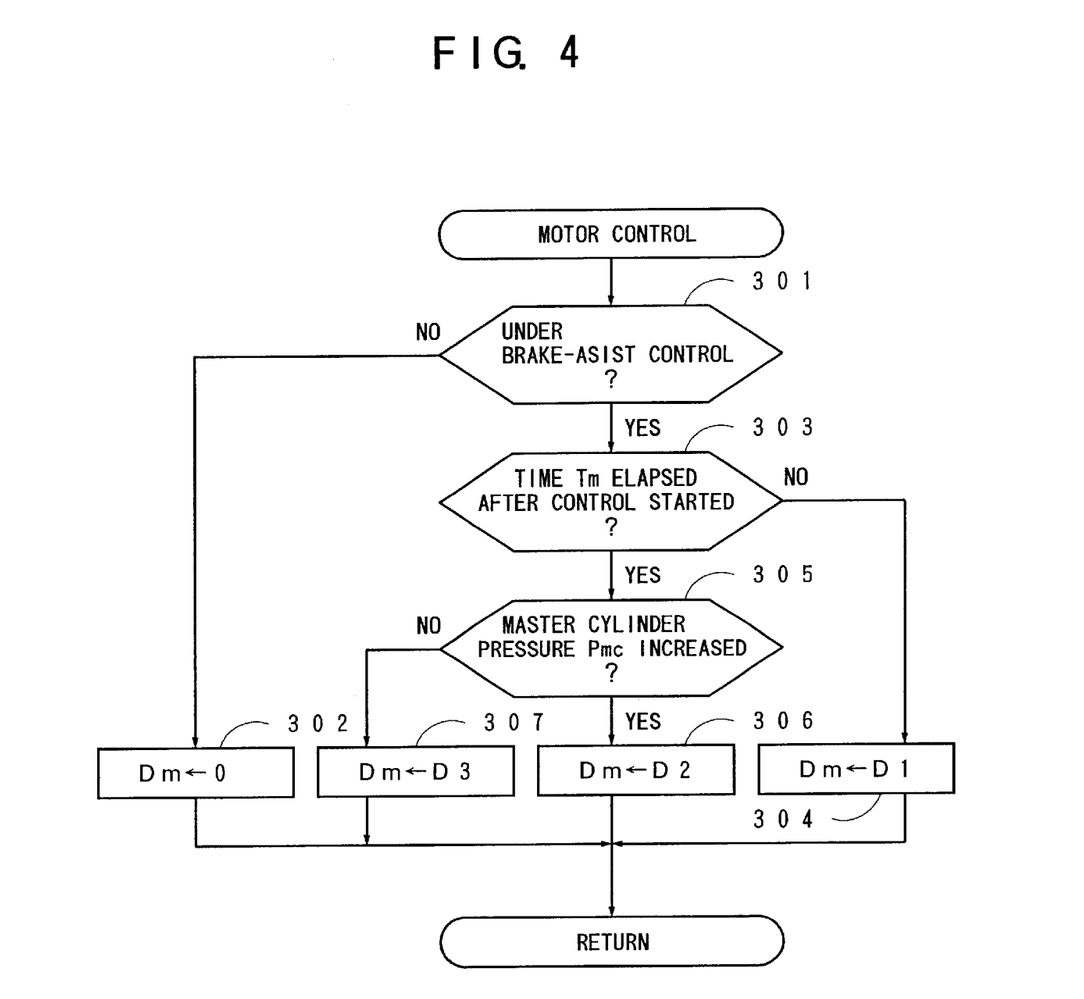
FIG.4 is a flowchart showing a sub-routine of a motor control according to an embodiment of the present invention.

Referring next to FIG.4, will be explained the process for controlling the motor M performed at Step 207. At Step 301, it is determined whether the brake-assist control is being performed, or not. If the brake-assist control is not being performed, the program proceeds to Step 302 where a motor duty Dm is set to be 0%. If the brake-assist control is being performed, the program proceeds to Step 303, where a predetermined time Tm (e.g., 0.5 sec) has elapsed after the brake-assist control started. If the result is negative, the program proceeds to Step 304 where the motor duty Dm is set to be D1 (e.g., 100%). In the case where the predetermined time Tm has elapsed after the control started, it is determined at Step 305 whether the master cylinder pressure Pmc has been increased, or not. If the master cylinder pressure Pmc has been increased, the program proceeds to Step 306 where the motor duty Dm is set to be D2 (e.g., 30%). On the other hand, if the master cylinder pressure Pmc has not been increased, or it has been decreased or held, the program proceeds to Step 307 where the motor duty Dm is set to be D3 (e.g., 10%). In other words, it is determined at Step 305 whether the operation of the brake pedal BP has been terminated to be in such a condition as holding the depression of the brake pedal BP. If the master cylinder pressure Pmc has been decreased or held, it is determined that the driver is not positively operating the brake pedal, so that it is determined to be in the condition of holding the depression of the brake pedal BP. In this condition, it is unnecessary to hold the pressure output from the pressure pumps HP1, HP2 to be at relatively high pressure, so that the motor duty Dm is set to be its minimum value (D3), and the motor M is rotated at low speed, whereby the noise of the motor is reduced largely. Whereas, in the case where the master cylinder pressure Pmc is being increased, it is determined to be under a normal operation of the brake pedal (i.e., depressing condition), the motor duty Dm is set to be D2 slightly larger than the duty of D3.

It is preferable to determine the variation of the amount of operation of the brake pedal BP based upon increase or decrease of the amount during a time period longer than the operation cycle of the anti-skid control or the like. According to the present embodiment, the increase or decrease of the master cylinder pressure Pmc is used for determining the variation of the amount of operation of the brake pedal BP, while increase or decrease of the stroke of the brake pedal BP may be used, instead.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A brake control system for a vehicle comprising:

a wheel brake cylinder operatively mounted on a wheel of said vehicle for applying a braking force thereto;

a master cylinder for pressurizing brake fluid to supply a hydraulic pressure to said wheel brake cylinder in response to operation of a brake pedal;

a main passage for communicating said master cylinder with said wheel brake cylinder;

cut-off valve means for opening or closing said main passage;

pump means with an outlet thereof connected to a position between said cut-off valve means and said wheel brake cylinder, said pump means discharging the pressurized brake fluid to said wheel brake cylinder;

an auxiliary passage for communicating an inlet of said pump means with said master cylinder;

inlet valve means for opening or closing said auxiliary passage;

control means for controlling said cut-off valve means, inlet valve means and pump means, said control means placing said cut-off valve means in a closed position thereof, placing said inlet valve means in an open position thereof, and actuating said pump means to supply the pressurized brake fluid discharged therefrom into said wheel brake cylinder to perform a brake-assist control;

detection means for detecting an amount of operation of said brake pedal, said control means controlling an amount of operation of said pump means in response to variation of the amount of operation of said brake pedal detected by said detection means; and said control means controlling the amount of operation of said pump means provided when it is determined on the basis of the output of said detection means that the amount of operation of said brake pedal is being decreased or held to be smaller than the amount of operation of said pump means provided when it is determined that the amount of operation of said brake pedal is being increased.

2. A brake control system as set forth in claim 1, wherein said detection means includes pressure detection means for detecting the hydraulic pressure output from said master cylinder, and wherein said control means controls the amount of operation of said pump means provided when it is determined on the basis of the output of said detection means that said master cylinder pressure is being decreased or held, to be smaller than the amount of operation of said pump means provided when it is determined on the basis of the output of said detection means that said master cylinder pressure is being increased.

3. A brake control system as set forth in claim 2, further comprising an electric motor for actuating said pump means, wherein said control means controls a duty of a signal for driving said motor provided when it is determined on the basis of the output of said detection means that said master cylinder pressure is being decreased or held, to be smaller than the duty of the signal for driving said motor provided when it is determined on the basis of the output of said detection means that said master cylinder pressure is being increased.

4. A brake control system as set forth in claim 3, wherein said control means sets the duty of the signal for driving said motor to be the maximum, when a predetermined time period has not elapsed after said brake-assist control started.

* * * * *